(12) United States Patent
Farrell

(10) Patent No.: US 12,086,072 B1
(45) Date of Patent: Sep. 10, 2024

(54) MEMORY VULNERABILITY MITIGATION

(71) Applicant: Amazon Technologies, Inc., Reno, NV (US)

(72) Inventor: Daniel John Farrell, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 80 days.

(21) Appl. No.: 16/816,044

(22) Filed: Mar. 11, 2020

(51) Int. Cl.
- *G06F 12/00* (2006.01)
- *G06F 11/10* (2006.01)
- *G06F 12/02* (2006.01)
- *G06F 12/1009* (2016.01)

(52) U.S. Cl.
CPC ...... *G06F 12/1009* (2013.01); *G06F 11/1044* (2013.01); *G06F 12/023* (2013.01)

(58) Field of Classification Search
CPC . G06F 12/1009; G06F 11/1044; G06F 12/023
See application file for complete search history.

(56) References Cited

U.S. PATENT DOCUMENTS

| | | | | |
|---|---|---|---|---|
| 2006/0107127 A1* | 5/2006 | Park | ................. | G06F 11/1048 714/704 |
| 2007/0089031 A1* | 4/2007 | Huffman | ............ | G06F 11/1012 714/763 |
| 2013/0117620 A1* | 5/2013 | Joo | .................... | G11C 16/3418 714/746 |
| 2014/0331015 A1* | 11/2014 | Prasad | ................. | G06F 12/126 711/159 |
| 2016/0307645 A1* | 10/2016 | Kim | ................... | G11C 29/4401 |
| 2017/0091026 A1* | 3/2017 | Gulati | .................... | G11C 29/52 |
| 2019/0004964 A1* | 1/2019 | Kanno | .................... | G06F 3/064 |
| 2020/0241956 A1* | 7/2020 | Son | ....................... | G06F 3/0679 |

\* cited by examiner

*Primary Examiner* — Arvind Talukdar
(74) *Attorney, Agent, or Firm* — HOGAN LOVELLS US LLP

(57) ABSTRACT

Vulnerabilities to physical memory, such as server dynamic random access memory (DRAM) with error correction code (ECC) capability, can be mitigated though the use of guard pages allocated in that physical memory. Physical memory pages can be mapped to virtual memory pages of a contiguous virtual address space. When an error such as a bit flip is detected in a physical memory page, the data from that physical memory page can be copied to a protected page, such as a guard page or page isolated from other sensitive data. Information such as an error correction code (ECC) can be used to determine and correct the erroneous bit. The mappings in a related page table can be updated such that the same virtual pages or addresses are then mapped to the guard page that now includes the relevant data.

20 Claims, 7 Drawing Sheets

MEMORY VULNERABILITY MITIGATION

BACKGROUND

In a multi-tenant resource environment, or "cloud environment," resources such as servers may be provisioned for use by various users. In some situations, users will have various portions of memory allocated on one of these servers for use by one or more user applications. While data for different users may be stored to different regions of memory on a server, there are various attacks that can impact data stored in one or more of these other regions. One such attack is a bit flip induced from user code, which can generate errors or other issues with regions of data associated with other users. While there are various approaches to mitigating these attacks, these approaches are often able to be defeated or come with excessive cost.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for mitigation of vulnerabilities to certain types of attacks or errors in physical memory. Various embodiments provide for the mitigation of memory vulnerabilities without costly hardware upgrades or replacement. In at least one embodiment, physical memory pages can be mapped to virtual memory pages of a contiguous virtual address space. When an error such as a bit flip is detected in a physical memory page, the data from that physical memory page can be copied to a protected page, such as a guard page or a page isolated from other sensitive data. Information such as an error correction code (ECC) can be used to determine and correct the erroneous bit. The mappings in a related page table can be updated such that the same virtual pages or addresses are then mapped to the guard page that now includes the relevant data. In this way, an application using the virtual addresses will not be able to determine that there was a change, and a malicious actor or process will be unable to make assumptions about which bits are being flipped or otherwise detect the mitigation.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1A:
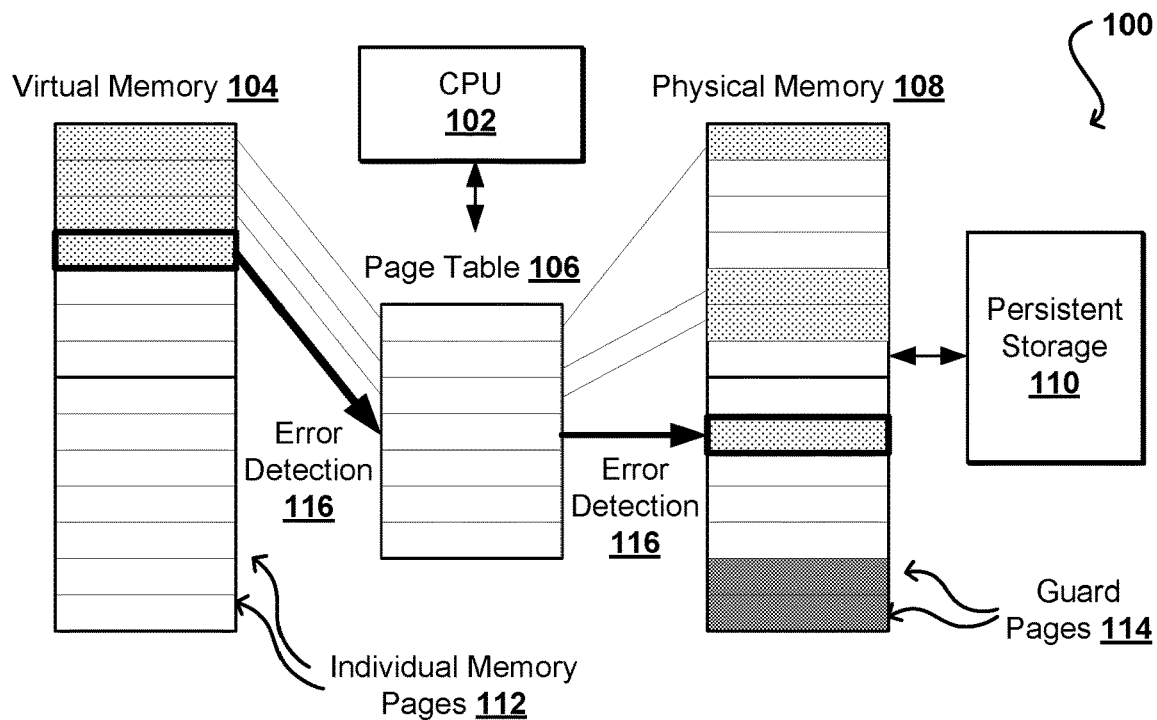
FIGS. 1A and 1B illustrate an approach to memory vulnerability mitigation that can be utilized in accordance with various embodiments.

FIG. 1A illustrates an example approach 100 to memory management that can be utilized in accordance with various embodiments. In this example, there can be physical memory 108, such as dynamic random access memory (DRAM), installed on a computing device such as a server. The physical memory 102 may store data accessible to one or more processors, such as a central processing unit (CPU) 102, of that computing device, where the data may be obtained from persistent storage 110, such as from a hard drive or hard disk. In this example, data obtained from persistent storage can be temporarily stored to regions of the physical memory, often referred to as memory pages. In at least some embodiments, a memory page is a block of memory of a determined length that has an associated physical memory address. In some embodiments the size of a memory page is the smallest unit of memory management in a virtual memory operating system (OS). The physical addresses of these memory pages can be mapped by the operating system, such as by a memory management unit (MMU) or hypervisor in some embodiments. As with conventional block data storage, the physical memory pages allocated to a user application at any given time will generally not be contiguous, and may be spread across the physical memory. Mapping of the physical memory pages enables data for that user application to be located by the relevant OS.

To enable a user application to utilize a contiguous address space instead of many different and fragmented regions of physical memory, these physical memory pages of the physical memory 108 can be mapped to a corresponding set of virtual memory pages in virtual memory 104. As illustrated, pages and addresses in virtual memory space can be allocated to an application from a contiguous address space, even though the mappings maintained in a page table 106 (or translation table), for example, may map to these fragmented regions of physical memory. Another benefit of the use of such virtual addresses is that a user application can be developed using these virtual addresses, as the developers may not know the appropriate physical memory addresses when generating the relevant application code. Use of virtual addresses by an application enables the relevant OS (or hypervisor) and hardware to manage the appropriate address translation and mapping. In various embodiments, each application will have a dedicated set of virtual addresses that will be mapped to different locations in physical memory 108. The OS can be responsible for utilizing the appropriate map table when switching between applications. Further, the page table 106 in memory is not static but can be updated as appropriate.

In at least some embodiments, a user application (or other such source associated with a user) can provide code or instructions that, when executed by the CPU 102 or another such processing element, can perform read and write operations with respect to those portions, or memory pages, of physical memory that are mapped to virtual memory accessible to that user application (or source). While these write operations are limited to memory space that is allocated to that user application, or to which that user application otherwise has read or write access, it is possible for those operations to impact data written to other physical memory locations. For example, bit flipping or bit manipulation can be induced from user code. In some instances, certain memory operations performed in RAM, such as DRAM, can result in a change in state, or "bit flip," of one or more bits in an adjacent memory location. In addition to generating errors in other data pages, bit flips can be used to for purposes such as to provide memory leaks of keys and privilege escalation to a kernel space, hypervisor space, or other user processes or applications.

Figure 2:
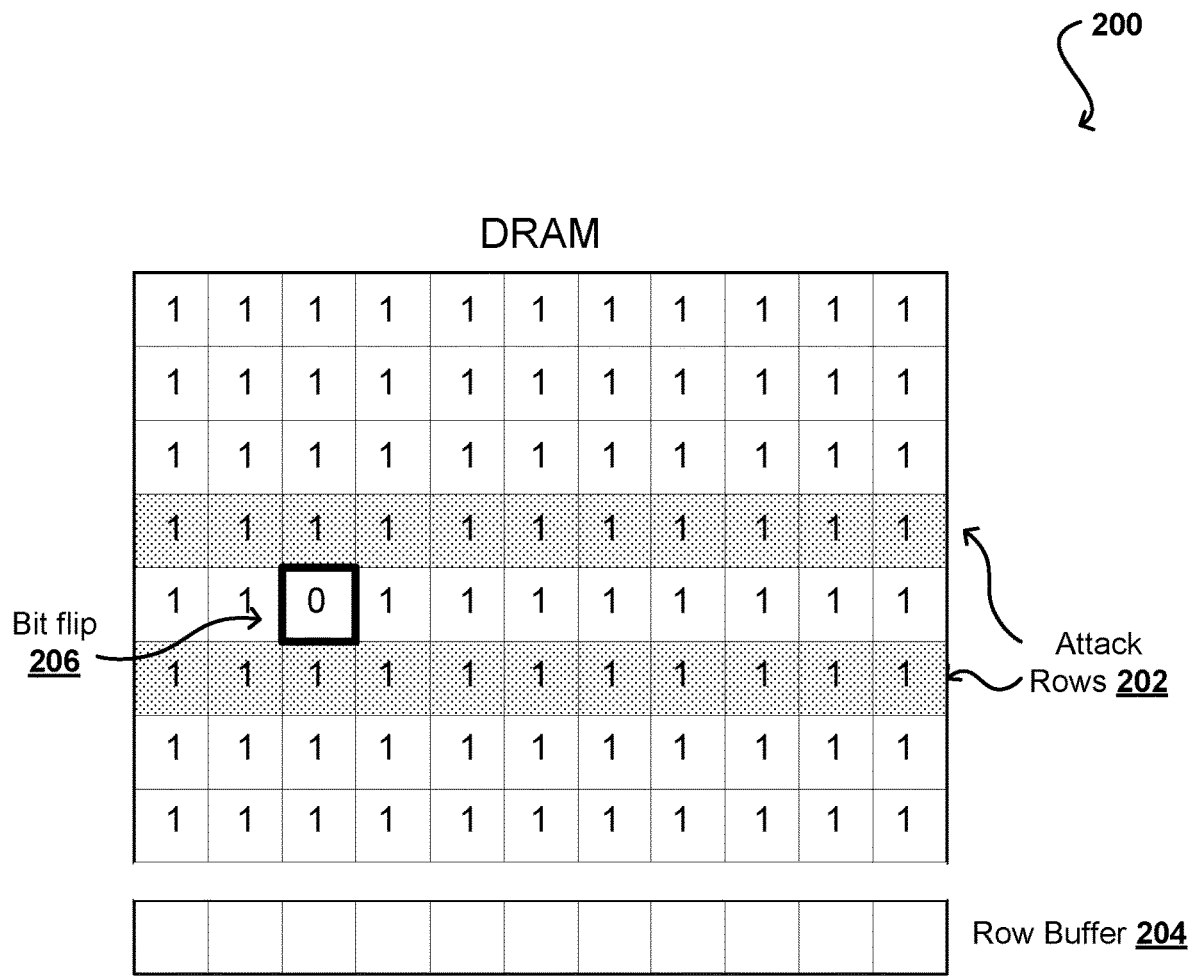
FIG. 2 illustrates the impact on memory of an example row hammer that can be mitigated in accordance with various embodiments.

One such attack is referred to as a row hammer attack. An example of a row hammer attack is illustrated in the memory page 200 of FIG. 2. A row hammer is a security exploit that can be utilized against memory such as DRAM, wherein memory cells leak charge and this leakage can impact a state of nearby memory rows. An attacker can utilize a specific memory access pattern to activate specific rows 202 of DRAM multiple times over a short period of time, which can potentially cause the cells in these attack rows 202 to leak enough charge that one or more cells 206 in an adjacent row can have a change in bit value or state, such as to switch from 0 to 1 or 1 to 0.

There are various conventional methods that can be used to attempt to prevent or mitigate such attacks. One such method is the use of error-correcting code (ECC) memory. ECC memory can be used to detect and correct internal data corruption by using an error-correcting code. A common error-correcting code is a single-error correction and double-error detection (SECDED) Hamming code. This SECDED code enables a single bit error to be corrected, and can detect an error in two bits, such as two bits in a single 64-bit word used for bus transfer. Unfortunately, such an ECC approach can only correct for single bit errors, and attack patterns can be used that are likely to trigger two or more bit flips, which can cause a server or computing device to need to be taken offline to remove or fix the corrupted memory. There are other approaches that can be used, such as memory that uses target row refresh (TRR) with ECC, but these approaches can come with significant extra costs, particularly for large data centers or providers with large server fleets. Further, while TRR-ECC solutions can make it more difficult for attackers to launch attacks such as row hammer attacks, speculative bit flips can still be staged and these protections defeated.

Accordingly, approaches in accordance with various embodiments can provide for the mitigation of memory attacks without the need for expensive and time-consuming hardware replacement. Such approaches can help protect against attacks such as RAM bleed, TRR exploits, and ECCploit style attacks. Attacks such as these can rely on physical memory layout and mapping remaining static between bit errors, such as where an ECCploit attack incrementally speculatively causes bit flips until three or more are created such that detection and correction is impossible using ECC-based methods, or where a RAMbleed attack relies upon causing speculatively single bit flips than be detected via a side-channel, leading to a leak of information. Approaches in accordance with various embodiments can mitigate these and other types of attacks by changing the physical layout of memory while maintaining the virtual layout. With such an approach in place, an attacker will be unable to make assumptions about which bits are being flipped, and will be unable to detect the mitigation.

Figure 1B:
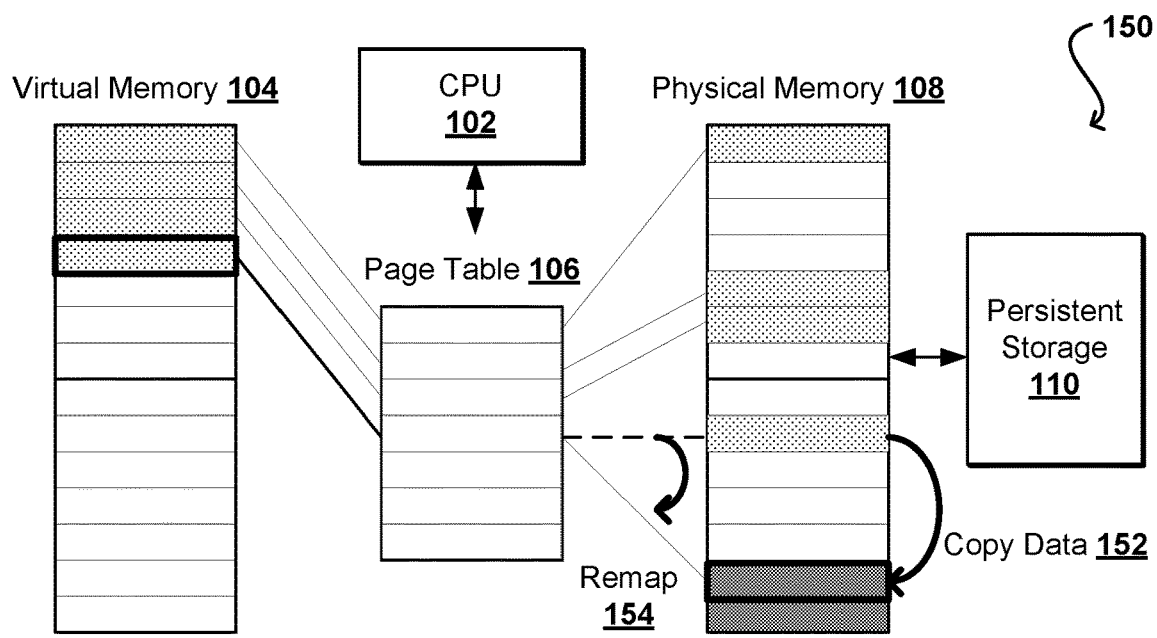

In at least one embodiment, such an approach can be achieved by using guard pages 114 in physical memory 108, as illustrated back in FIG. 1A. These guard pages 114 can be isolated such that bits of these pages can be flipping without causing exploit. In at least one embodiment, a page can be considered to be "isolated" if the data for that page is stored to a location in memory in which no sensitive data is stored in one or more adjacent rows that would be susceptible to errors such as bit flips. In at least one embodiment, an isolated page may have one or more adjacent rows (or other grouping of storage cells or elements) where no data will be stored, regardless of sensitivity. In still other embodiments, a page may be considered isolated if it is stored to a device to which no other data, or sensitive data, is stored. In at least one embodiment, a certain percentage (or maximum percentage, etc.) of physical memory can be dedicated to providing guard pages. In at least one embodiment, a detection of a speculative bit flip can be made, as by ECCploit or RAMbleed. This can occur for an error detection process 116 as illustrated by the bold arrows in FIG. 1A, where an application uses the CPU 102 to perform memory operations for addresses in virtual memory 104, which through the page table 106 are mapped to a specific physical memory page in physical memory 108. Upon detection of this speculative bit flip, data from the original physical page can be copied 152 to one of the guard pages 114 in physical memory, as illustrated in the environment of FIG. 1B. In addition, the corresponding virtual page in virtual memory 104 can be remapped 154 to correspond to the guard page that now contains the data from the original physical page. In this approach, any memory operation that utilizes the same virtual address space will actually be performed on data in the isolated guard page, wherein bit flips can not only be detected and corrected, but can also be prevented from having negative impact on other memory cells outside that guard page. The management of these mappings and detection of errors can be performed in various environments, such as in a kernel or hypervisor space. In some embodiments, the ECC will notify the OS in the kernel or hypervisor that a bit of RAM had an error induced, and the OS can attempt to fix the error based on the ECC information. Such error correction is typically a relatively lengthy process, where the presence of this noticeable delay is one way in which an attacker can determine that an error was triggered. Comparatively, there is little additional latency or overhead incurred through the copying of the data to a guard page, such that the copying may not lead to suspicion on the part of an attacker. Such an approach also can be performed without expensive hardware updates or replacement, such as to implement TRR. In some embodiments, guard pages may be implemented using different physical RAM or memory that was originally used to store the physical memory page. In some embodiments there may be a set or number of guard pages allocated at boot time for the OS. If additional guard pages are needed, an additional physical page can be allocated using a page allocator of the system.

In some embodiments, the OS will get notification of an error at one or more bits in physical memory, and then will have to determine the corresponding virtual addresses. In one embodiment, this can involve traversing entries in the corresponding page table 106 until the corresponding virtual pages and addresses are identified. In some embodiments, page table entries can be augmented to provide a reverse mapping from physical page to logical or virtual page for each process. With such augmentation, a process for fixing memory pages can just look at the relevant process and map the physical page with the error back into the virtual page, and more quickly update the relevant mapping. In some embodiments, the process of copying the data over to a guard page can also involve wiping, or deleting the data (or filling that physical memory region with random data, etc.) after copying is completed and verified, from the previous physical memory page location, in order to prevent any further potential risk with respect to that data, or nearby data, in un-isolated memory.

Such approaches can also help to improve the resiliency of a server fleet. It is normal for a Web service to experience occasional RAM errors. Oftentimes these errors are not malicious, but may be due to the imperfect nature of the hardware. The ability to use such an approach to fix a memory page and update the virtual mapping when an error is detected can reduce the likelihood of the server being taken out of commission or a user otherwise experiencing an impact of these memory errors.

Figure 3:
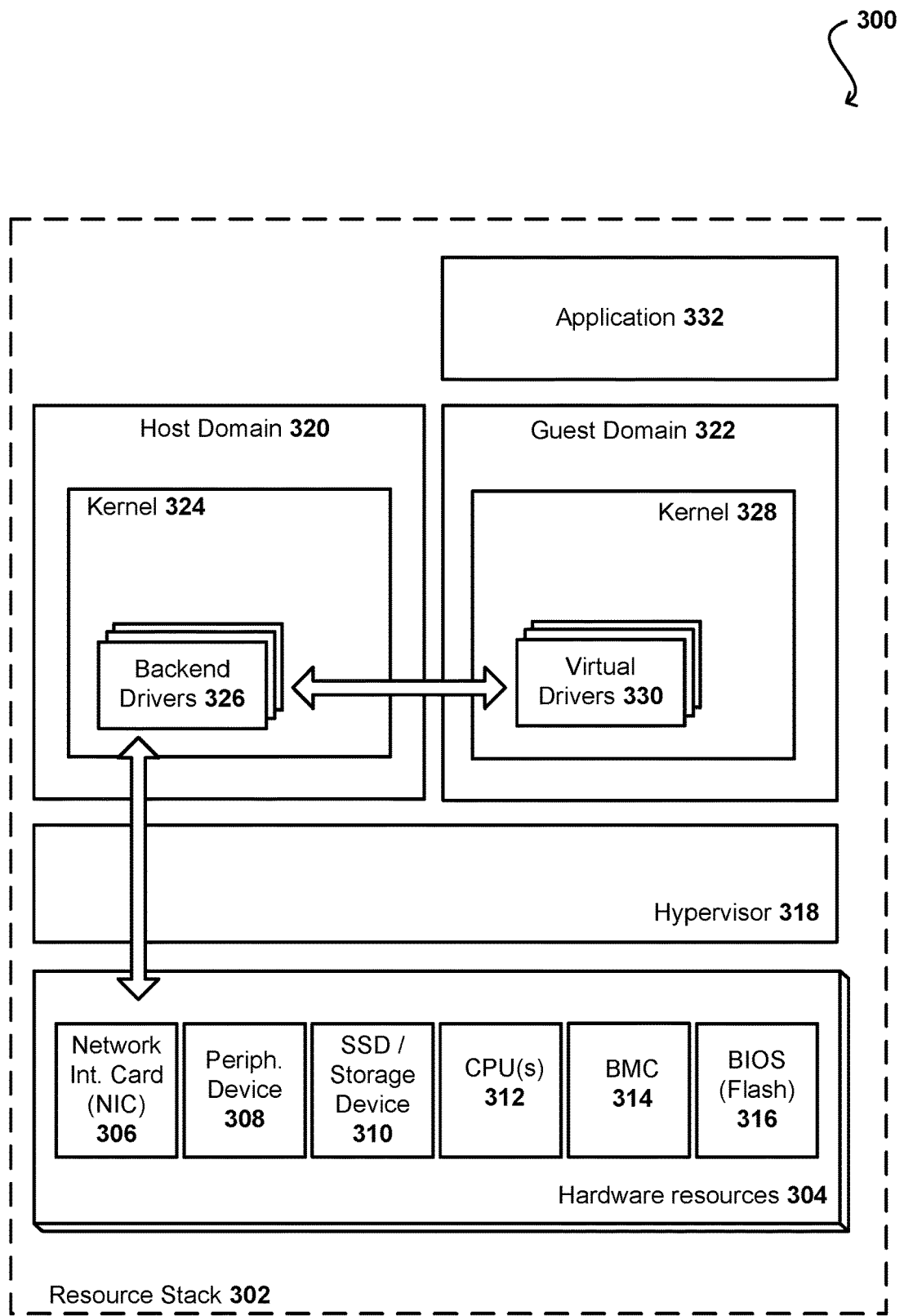
FIG. 3 illustrates an example configuration for providing virtual machines on a server that can be utilized in accordance with various embodiments.

As mentioned, in some embodiments these memory errors can occur in a virtualized environment. Components of an example computing resource 300 in such a virtualized environment are illustrated in FIG. 3. In this example, a resource stack 302 can be used to provide an allocated environment for a user (or customer of a resource provider) having an operating system (OS) provisioned on the resource. In accordance with the illustrated embodiment, the resource stack 302 includes a number of hardware resources 304, such as one or more central processing units (CPUs) 312; solid state drives (SSDs) or other storage devices 310; a network interface card (NIC) 306, one or more peripheral devices (e.g., a graphics processing unit (GPU), etc.) 308, a BIOS implemented in flash memory 316, and a baseboard management controller (BMC) 314, and the like. In some embodiments, the hardware resources 304 reside on a single computing device (e.g. chassis). In other embodiments, the hardware resources can reside on multiple devices, racks, chassis, and the like. Running on top of the hardware resources 304, a virtual resource stack may include a virtualization layer such as a hypervisor 318 for a Xen-based implementation, a host domain 320, and one or more guest domains 322 capable of executing at least one application 332. The hypervisor 318 can manage execution of the one or more guest operating systems and allow multiple instances of different operating systems to share the underlying hardware resources 304. Conventionally, hypervisors are installed on server hardware, with the function of running guest operating systems, where the guest operating systems themselves act as servers.

In accordance with an embodiment, a hypervisor 318 can host a number of domains (e.g., virtual machines), such as the host domain 320 and one or more guest domains 322. In one embodiment, the host domain 320 (e.g., the Dom-0) is the first domain created and helps virtualize hardware resources and manage all of the other domains running on the hypervisor 318. For example, the host domain 320 can manage the creating, destroying, migrating, saving, or restoring the one or more guest domains 322 (e.g., the Dom-U). In accordance with various embodiments, the hypervisor 318 can control access to the hardware resources such as the CPU, input/output (I/O) memory, and hypervisor memory.

A guest domain 322 can include one or more virtualized or para-virtualized drivers 330 and the host domain can include one or more backend device drivers 326. When the operating system (OS) kernel 328 in the guest domain 322 wants to invoke an I/O operation, the virtualized driver 330 may perform the operation by way of communicating with the backend device driver 326 in the host domain 320. When the guest driver 330 wants to initiate an I/O operation (e.g., to send out a network packet), a guest kernel component can identify which physical memory buffer contains the packet (or other data) and the guest driver 330 can either copy the memory buffer to a temporary storage location in the kernel for performing I/O or obtain a set of pointers to the memory pages that contain the packet(s). In at least one embodiment, these locations or pointers are provided to the backend driver 326 of the host kernel 324 which can obtain access to the data and communicate it directly to the hardware device, such as the NIC 306 for sending the packet over the network.

It should be noted that the resource stack 302 illustrated in FIG. 3 is only one possible example of a set of resources that is capable of providing a virtualized computing environment and that the various embodiments described herein are not necessarily limited to this particular resource stack. In some embodiments, the guest domain 322 may have substantially native or "bare metal" access to the hardware, as provided by device assignment technology based on an IO Memory Management Unit (IO-MMU) device mapping solution like Intel VT-D. In such an implementation, there may be no virtualization layer (e.g., Hypervisor) present. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In at least one embodiment the Hypervisor 318 can detect bit errors in RAM using ECC. The Hypervisor can then notify a logging system, where a log is triggered and sent for analysis. As mentioned, for a single bit error ECC can be used to fix that error. If there are two or more errors then the log data can be used to indicate to a technician or other person that a physical check or change is needed. If a single error is detected in at least one embodiment, the detection can trigger a copying of the data to a guard page and remapping of the virtual space as discussed herein. In a bare metal implementation, an OS such as Linux could use such a technique to detect and fix bit errors.

Figure 4:
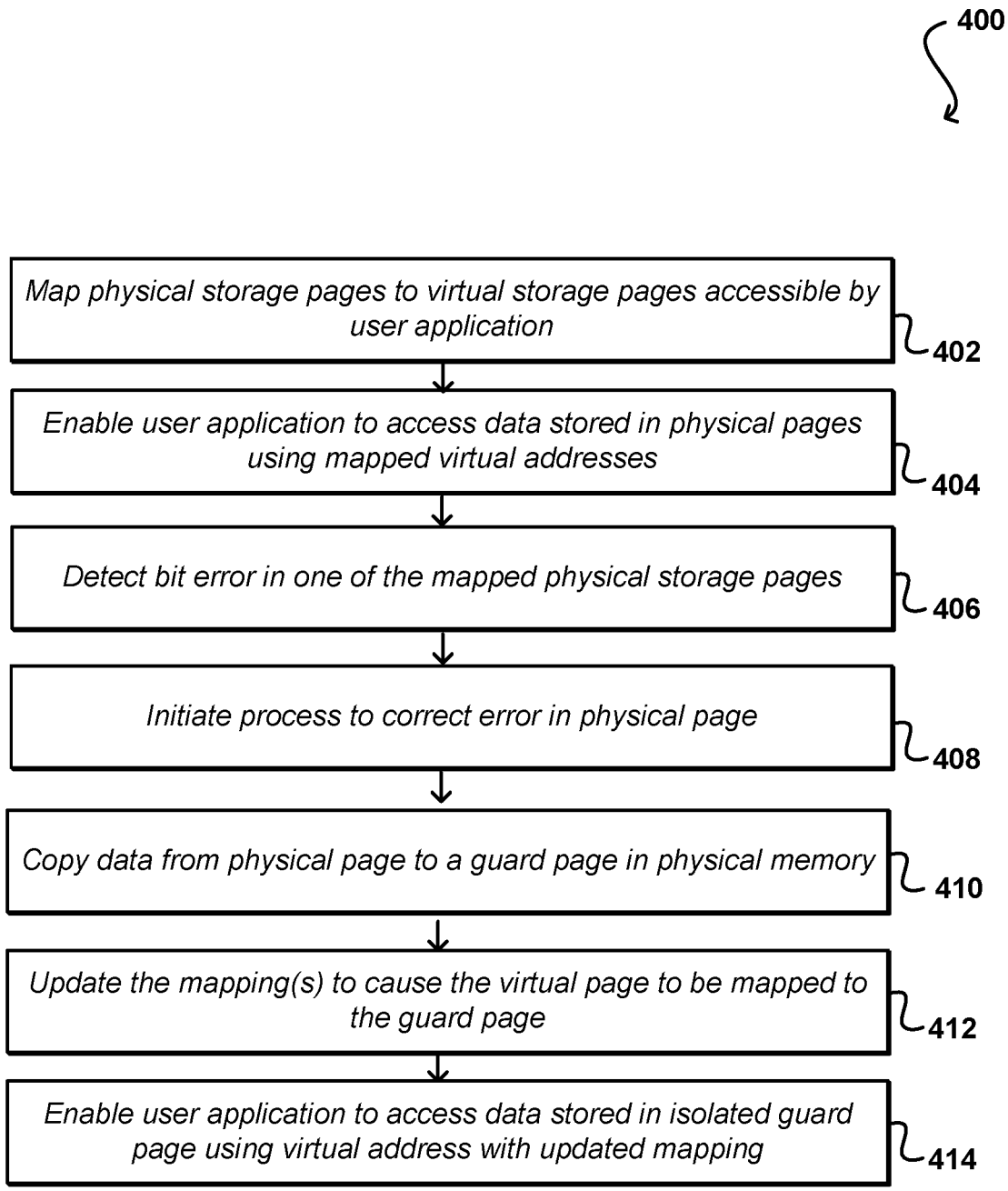
FIG. 4 illustrates an example process for managing physical memory in response to an error detection that can be utilized in accordance with various embodiments.

FIG. 4 illustrates an example process 400 for detecting and fixing memory errors that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a set of physical storage pages is mapped 402 to a set of virtual storage pages, corresponding to a contiguous virtual address space, to be accessible to a user application, or other source having access to perform memory operations with respect to the physical memory. The user application can then be enabled 404 to access data stored in those physical pages using the mapped virtual addresses. As mentioned, the physical pages may be distributed and non-contiguous, so the use of a virtual address space can simplify data operations for the user application.

In this example, a bit error is detected 406 in one of the mapped physical storage pages. In response, a process can be initiated 408 to correct the error in the physical page. This can include, for example, determining the correct value of the bit from ECC and analyzing the page table to determine the corresponding virtual address and user application or process. As part of the error correction, the data from the physical page can be copied 410 to a guard page in physical memory. As mentioned, this guard page can be isolated from other sensitive data, and in at least some implementations may be part of a different physical memory device. Along with the copying, the relevant mapping(s) can be updated 412 to cause the virtual page to be mapped to the guard page. Once the data is copied over and the mapping updated, the user application can be enabled 414 to access data stored in the isolated guard page using a virtual address and the updated mapping. As mentioned, such usage can help to mitigate various memory attacks as the movement and isolation of data can prevent a malicious process or actor from detecting an impact of, or other information corresponding to, the attack.

Figure 5:
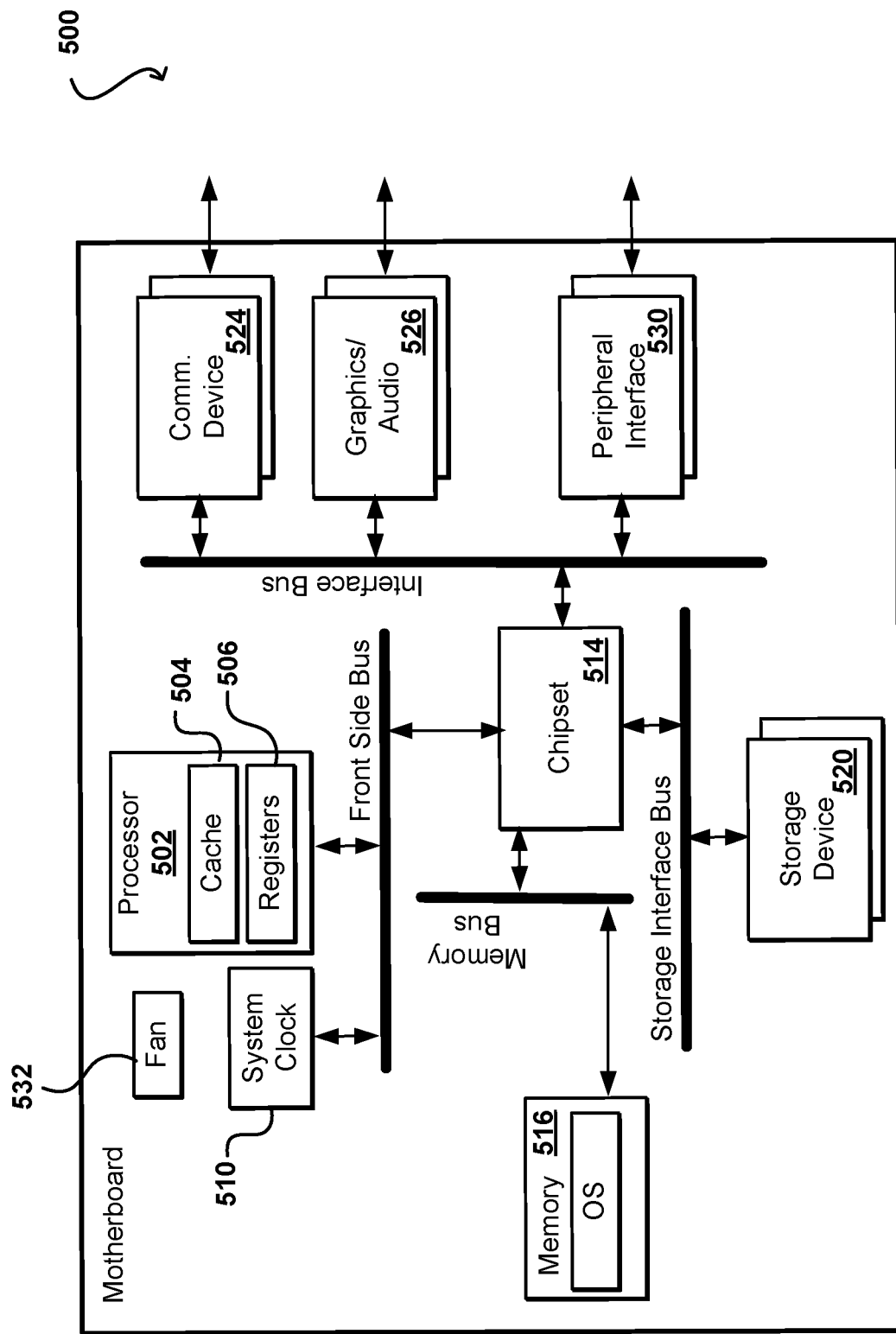
FIG. 5 illustrates components of an example computing device that can be utilized in accordance with various embodiments.

Computing resources, such as servers, that can utilize such approaches to memory management will generally include at least a set of standard components configured for general purpose operation, although various proprietary components and configurations can be used as well within the scope of the various embodiments. FIG. 5 illustrates components of an example computing device 500 that can be utilized in accordance with various embodiments. As known for computing devices, the computer will have one or more processors 502, such as central processing units (CPUs), graphics processing units (GPUs), and the like, that are electronically and/or communicatively coupled with various components using various buses, traces, and other such mechanisms. A processor 502 can include memory registers 506 and cache memory 504 for holding instructions, data, and the like. In this example, a chipset 514, which can include a northbridge and southbridge in some embodiments, can work with the various system buses to connect the processor 502 to components such as system memory 516, in the form or physical RAM or ROM, which can include the code for the operating system as well as various other instructions and data utilized for operation of the computing device. The computing device can also contain, or communicate with, one or more storage devices 520, such as hard drives, flash drives, optical storage, and the like, for persisting data and instructions similar, or in addition to, those stored in the processor and memory. The processor 502 can also communicate with various other components via the chipset 514 and an interface bus (or graphics bus, etc.), where those components can include communications devices 524 such as cellular modems or network cards, media components 526, such as graphics cards and audio components, and peripheral interfaces 530 for connecting peripheral devices, such as printers, keyboards, and the like. At least one cooling fan 532 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 502 can obtain data from physical memory 516, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 504 in at least some embodiments. The computing device 500 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 530, a communication device 524, a graphics or audio card 526, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 502 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O) adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the V/O adapter device is attached externally to the host device. In some embodiments, the I/O adapter device is internally integrated into the host device. Also in communication with the VO adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate Other types of communication channels, communication media, communication buses or communication protocols (e.g, the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the V/O) adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the VO adapter device may selectively close a hardware latch for one or more components based on a trust level associated with an author or distributor of the executable code to be executed by the I/O adapter device In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 6:
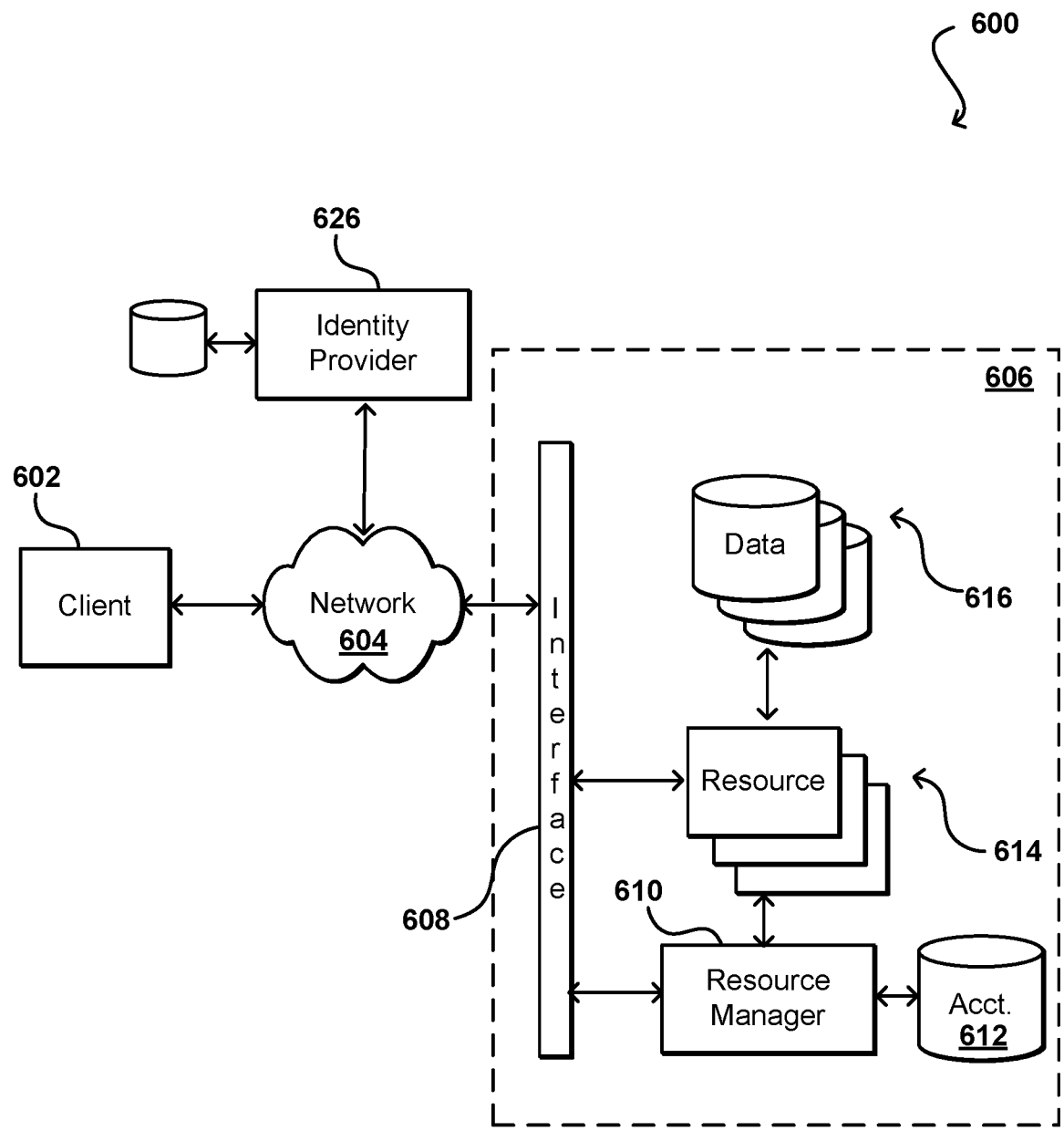
FIG. 6 illustrates components of an example environment in which aspects of the various embodiments can be implemented.

FIG. 6 illustrates an example system 600 that can enable a user to obtain access to resources provided as part of a resource provider environment 606. These resources can include physical and virtual resources that may be located at one or more locations controlled by the provider or a third party, or may be located on a location controlled by the user, or an entity with which the user is associated. In this example, a user can utilize a client device 602 to access resources of the resource provider environment 606 over one or more networks. The client device 602 can include any appropriate electronic device operable to send and receive requests, messages, or other such information over an appropriate network and convey information back to a user of the device. Examples of such client devices include personal computers, tablet computers, smart phones, notebook computers, and the like. The network(s) 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

The resource provider environment 606 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

In various embodiments, the resource provider environment 606 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instance of one or more types of these resources. In at least one embodiment, a resource instance can include storage volumes, compute instances, and network interfaces, among other such options. This can include, for example, enabling a customer to launch one or more instance of one or more types of these resources. In at least one embodiment, a resource instance can include storage volumes, compute instances, and network interfaces, among other such options. The sharing of these multi-tenant resources from a provider environment is often referred to as resource sharing, Web services, or "cloud computing," among other such terms and depending upon the specific environment and/or implementation. In this example the provider environment includes a plurality of electronic resources 614 of one or more types. These types can include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 618, a key management service, a corporate entity, a certificate authority, an identify broker, and the like. In some embodiments, a user can provide information useful in obtaining the credentials, such as user identity, account information, password, user-specific cryptographic key, customer number, and the like. The identity provider can provide the credentials to the resource provider environment 606 and/or to the client device 602, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes.

The resource manager 610 (or another such system or service) in this example can also function as a virtual layer of hardware and software components that handles control functions in addition to management actions, as may include provisioning, scaling, replication, etc. The resource manager 610 can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 808 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service.

Figure 7:
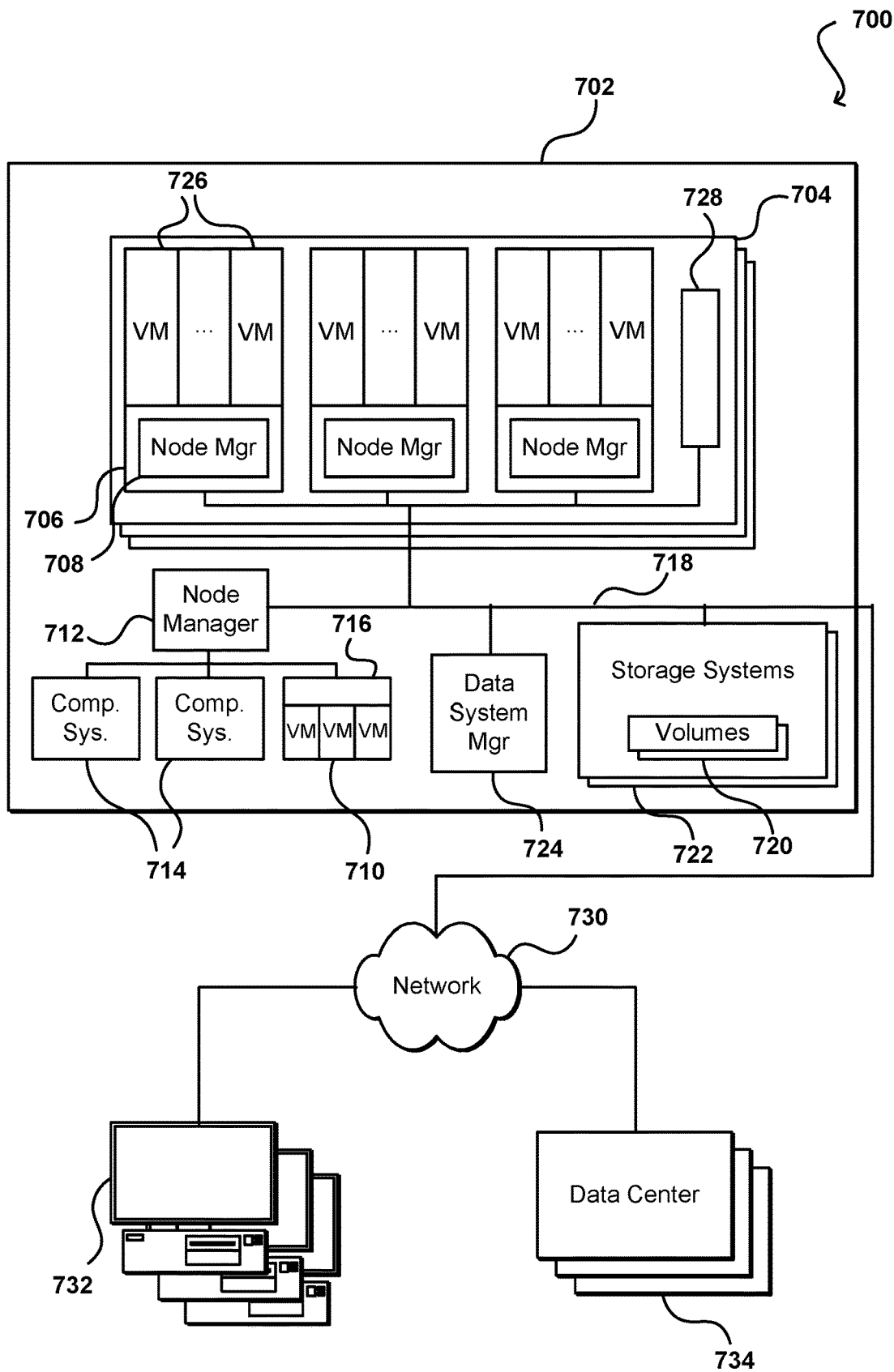
FIG. 7 illustrates components of another example environment in which aspects of the various embodiments can be implemented.

FIG. 7 illustrates an example network configuration 700 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 702 includes a number of racks 704, each rack including a number of host computing devices 706, as well as an optional rack support computing system 728 in this example embodiment. The host computing systems 706 on the illustrated rack 704 each host one or more virtual machines 726 in this example, as well as a distinct node manager module 712 associated with the virtual machines on that host computing system to manage those virtual machines. One or more other host computing systems 716 may also each host one or more virtual machines 710 in this example. Each virtual machine 710 may act as an independent resource node for executing one or more program copies or performing another such action or process for user data requests, I/O operations, etc. In addition, this example data center 702 further includes additional host computing systems 714 that do not include distinct virtual machines, but may nonetheless each act as a resource node for one or more tasks being executed for a user. In this example, a node manager module 712 executing on a computing system (not shown) distinct from the host computing systems 714 and 716 is associated with those host computing systems to manage the resource nodes provided by those host computing systems, such as in a manner similar to the node manager modules 708 for the host computing systems 706. The rack support computing system 728 may provide various utility services for other computing systems local to its rack 704 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 702 also includes a computing system 724 that executes a data storage system manager module for the block-based data storage service to assist in managing the availability of non-local block-based data storage to programs executing on resource nodes provided by the host computing systems located within the data center (or optionally on computing systems located in one or more other data centers 734, or other remote computing systems 732 external to the data center). In particular, in this example the data center 702 includes a pool of multiple block-based data storage systems 722, which each have local block-based storage for use in storing one or more volume copies 720. Access to the volume copies 720 is provided over the internal network(s) 718 to programs executing on various resource nodes 710 and 714. As discussed in greater detail elsewhere, a block-based data storage system manager module 724 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 722 may coordinate with the node manager modules 712, 708 to manage use of volumes by programs executing on associated resource nodes, while in other embodiments the node manager modules may not be used to manage such volume use. In addition, in other embodiments, one or more system manager modules 724 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 722 (e.g., in a peer-to-peer manner, without any separate centralized system manager module on a computing system 724).

In this example, the various host computing systems, server block data storage systems, and computing systems are interconnected via one or more internal networks 718 of the data center, which may include various networking devices (e.g., routers, switches, gateways, etc.) that are not shown. In addition, the internal networks 718 are connected to an external network 730 (e.g., the Internet or another public data network) in this example, and the data center 702 may further include one or more optional devices (not shown) at the interconnect between the data center and an external network (e.g., network proxies, load balancers, network address translation devices, etc.). In this example, the data center 702 is connected via the external network 730 to one or more other data centers 734 that each may include some or all of the computing systems and storage systems illustrated with respect to data center 702, as well as other remote computing systems 732 external to the data center. The other computing systems 732 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 7 has been simplified for the purposes of explanation, and that the number and organization of host computing systems, server block data storage systems and other devices may be much larger than what is depicted in FIG. 7. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 7 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 7, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "Attach Volume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "Detach Volume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Example environments discussed herein for implementing aspects in accordance with various embodiments are primarily Web-based, as relate to Web services and cloud computing environments, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   allocating a set of physical memory pages for use by an application;
   mapping the set of physical memory pages to a set of virtual memory pages, wherein the application can request data operations to be performed in the set of physical memory pages using virtual addresses of the virtual memory pages;
   responsive to detecting an anomalous bit flip in an identified memory page of the set of physical memory pages, copying data, including a corrected value for the bit corresponding to the bit flip, from the identified memory page to a physical guard page of a set of physical guard pages, wherein each storage cell adjacent to the physical guard page is not allocated by the application to store data;
   updating a mapping of the virtual memory pages from the identified memory page to the physical guard page; and
   enabling the application to request the data operations to be performed in the physical guard page using the virtual addresses of the virtual memory pages.

2. The computer-implemented method of claim 1, further comprising:
   detecting the bit flip, and correcting the value for the bit corresponding to the bit flip, using an error correction code (ECC).

3. The computer-implemented method of claim 1, further comprising:
   allocating the set of physical memory pages to a portion of a dynamic random access memory (DRAM) device.

4. The computer-implemented method of claim 1, further comprising:
   traversing a page table to determine one of the virtual memory pages mapped to the identified physical memory page.

5. The computer-implemented method of claim 1, further comprising:
   logging information for the bit flip to an error log for one or more computing devices, wherein a number, frequency, or location of a plurality of bit flips is indicative of a potential memory attack.

6. A computer-implemented method, comprising:
   responsive to detecting an anomalous bit error in at least a subset of data stored in an allocated region of physical memory, moving the data stored in the allocated region, including a corrected value for a bit corresponding to the bit error, to an isolated region of the physical memory, wherein each storage cell adjacent to the physical guard page is not allocated by the application to store data; and
   updating a mapping from an allocated region of virtual memory, previously mapped to the allocated region, to the isolated region of the physical memory, wherein requests to access the data can continue to use a virtual address corresponding to the allocated region of the virtual memory.

7. The computer-implemented method of claim 6, wherein the allocated region of physical memory is a physical memory page, and wherein the allocation region of virtual memory is a virtual memory page.

8. The computer-implemented method of claim 6, further comprising:
   detecting the bit flip, and correcting the value for the bit corresponding to the bit flip, using an error correction code (ECC).

9. The computer-implemented method of claim 6, further comprising:
   allocating the region of physical memory from a portion of a dynamic random access memory (DRAM) device.

10. The computer-implemented method of claim 9, further comprising:
    allocating the isolated region of physical memory from another portion of the DRAM device, the isolated region corresponding to a physical guard page.

11. The computer-implemented method of claim 6, further comprising:
    traversing a mapping table to the allocated region of virtual memory mapped to the allocated region of physical memory.

12. The computer-implemented method of claim 6, wherein the moving of the data and the updating of the mapping are performed by an operating system (OS) in a kernel or hypervisor on a computing device.

13. The computer-implemented method of claim 6, further comprising:

logging information for the bit flip to an error log for one or more computing devices, wherein a number, frequency, or location of a plurality of bit flips is indicative of a potential memory attack.

14. The computer-implemented method of claim 6, wherein the allocated region of physical memory is one of a plurality of allocated regions of the physical memory, wherein different allocated regions of the plurality are able to store data for different users.

15. A non-transitory computer-readable storage medium including instructions that, when executed by the processor, cause the processor to:
   responsive to detecting an anomalous bit error in at least a subset of data stored in a physical memory page, move the data stored in the physical memory page, including a corrected value for a bit corresponding to the bit error, to a physical guard page of a set of physical guard pages, wherein each storage cell adjacent to the physical guard page is not allocated by the application to store data; and
   update a mapping from a virtual memory page, previously mapped to the physical memory page, to the physical guard page, wherein requests to access the data can continue to use a virtual address corresponding to the virtual memory page.

16. The non-transitory computer-readable storage medium of claim 15, wherein the instructions when executed further cause the system to:
   detect the bit flip, and correct the value for the bit corresponding to the bit flip, using an error correction code (ECC).

17. The non-transitory computer-readable storage medium of claim 15, wherein the instructions when executed further cause the system to:
   allocate the physical memory page from a portion of a dynamic random access memory (DRAM) device.

18. The non-transitory computer-readable storage medium of claim 17, wherein the instructions when executed further cause the system to:
   allocate the physical guard page from another portion of the DRAM device or a second DRAM device.

19. The non-transitory computer-readable storage medium of claim 15, wherein the instructions when executed further cause the system to:
   traverse a mapping table to the allocated region of virtual memory mapped to the allocated region of physical memory.

20. The non-transitory computer-readable storage medium of claim 15, wherein the instructions when executed further cause the system to:
   delete the data stored in the physical memory page after the data is verified to be stored successfully to the physical guard page.

* * * * *